July 26, 1960    W. LENNARTZ    2,946,363
PLASTIC FOLDERS AND LIKE CONTAINERS FOR FLAT ARTICLES
Filed Feb. 18, 1957
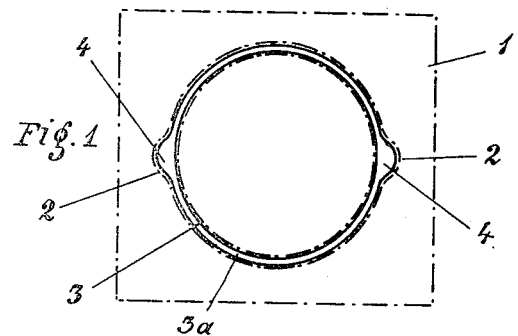
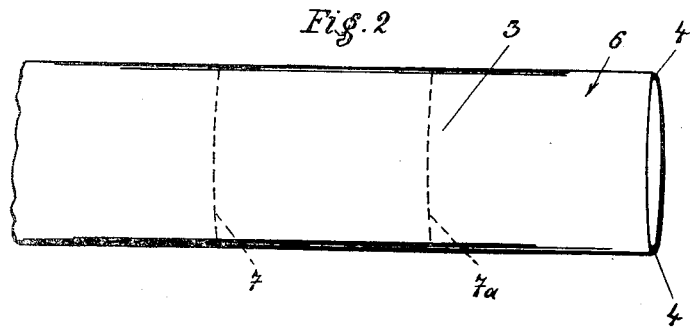
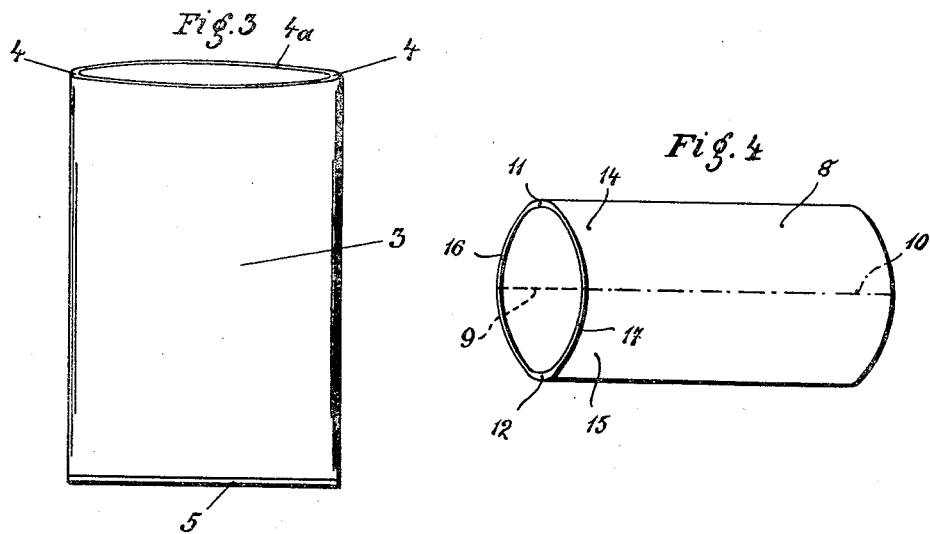
INVENTOR.
WALTER LENNARTZ
BY United States Patent Office 2,946,363
Patented July 26, 1960

2,946,363

PLASTIC FOLDERS AND LIKE CONTAINERS FOR FLAT ARTICLES

Walter Lennartz, Siedlungstrasse 19, Dachau, Germany

Filed Feb. 18, 1957, Ser. No. 640,973

7 Claims. (Cl. 150—1)

This invention relates to covers, folders for holding documents and similar devices adapted to receive substantially flat articles, such as papers, loose leaves, documents and the like for filing, storing etc.

Heretofore known cover or folder structures of the aforesaid type made from transparent resinous material were strengthened at the fold by means of additional ledges or U-shaped strips and like reinforcements which were either heat-sealed or otherwise affixed to the outer surface portions of the fold.

The present invention avoids any manual work required for fabricating these known structures and proposes a process for the manufacture of covers, folders and like devices from thermoplastic and like resinous material and has as one of its main objects to provide means increasing the durability of such folders or covers and simplifying the manufacturing operation thereof, so that very inexpensive mass-produced folders and like articles are obtained.

The heretofore known covers with U-shaped reinforcing strips necessitate separate manufacture of the strips from a material quite different and more rigid than that from which the folder or cover proper is produced, several operational steps for adjusting the strips and connecting the same along the fold of the cover or folder having been required, from which the reinforcing U-shaped strips, however, became easily separated during handling.

The present invention aims at overcoming all these inconveniences and disadvantages and proposes the production of covers and similar document holding devices from a lengthy seamless tubular body obtained through injection or extrusion process and provided with oppositely disposed thickened, reinforced ledges of fold edges.

It is, therefore, another object of the present invention to provide means affording inexpensive and speedy manufacture of covers, folders and like devices for holding documents and similar flat papers or articles from a single piece of material, whereby the folds of said covers are simultaneously reinforced although made from the same material as the covers themselves.

It is still a further object of the present invention to provide means ensuring simplified and efficacious manufacture of folders or covers of the aforesaid type in a single operation and without regard to their reinforced folds incorporated in or forming integral part or parts of said covers.

These and other objects of the invention will become further apparent from the following detailed description, reference being made to the accompanying drawing showing preferred embodiments of the invention.

In the drawing:

Fig. 1 is a plan view of a portion of an injection mold for producing a tubular article having opposite reinforcement ledges and embodying the invention.

Fig. 2 shows a lengthy piece of a tubular article produced through extrusion or injection in the mold according to Fig. 1.

Fig. 3 is an enlarged side elevational view, partly in perspective, of a section severed from the tubular article of Fig. 2.

Fig. 4 illustrates a step in the process of producing twin covers or folders from a section of the tubular article shown in Fig. 2.

Referring now more particularly to Fig. 1 of the attached drawing, there is schematically indicated a mold 1 having an inner hollow space 3a and opposite lateral enlargements 2 for the production of a hollow article 3 of substantially tubular or circular form provided with the reinforcement edges 4 which article upon removal from the form or mold 1 presents a flat tube 6 of elongated formation which may be sectioned at 7, 7a as indicated, to thereby attain substantially flat tube sections whose diameter corresponds to the desired width of the cover or folder.

The folder material may be either extruded or obtained through injection molding in the aforesaid form 1 and may consist of polyethylene, vinyl chloride-acetate resins, vinyl chloride resins, allyl resins, methyl-methacrylate resins, polystyrene, polythene-base compounds and other well known thermosetting and thermoplastic materials which can be formed through extrusion or injection methods.

Fig. 3 illustrates a finished bag-shaped transparent cover in which the cut-off edge 5 is heat-sealed or in any other way closed, such as by gluing, welding or the like.

The enlarged or reinforced fold edges 4 extend gradually or taper toward the cover walls 4a which are relatively thin, tearing of the cover at the most critical fold locations being rendered nearly impossible.

According to the embodiment of Fig. 4, the tubular section 8 (derived from tubular article 6) is cut along axial median lines 9 and 10, respectively, to thereby obtain two folders 14, 15 with reinforced fold edges 11 and 12, respectively, which correspond to the enlarged or reinforced folds 4 of the article 3 of Fig. 3. The two folders 14 and 15 have opposed cover parts which are formed by continuously cutting by suitable knife means (not shown) when the tubular article 8 discharged from the extrusion press is moved along said knife means, so that one or two folder units 14 and 15 are obtained depending upon whether said tubular article 8 is cut along cut line 10 and/or cut line 9.

End edges 16, 17 may also be heat-sealed in superposed position similar to the heat-sealed edge seen in Fig. 3, if desired.

Due to the fact that the tubular article 8 is of double width compared to the single folder unit 14 or 15, the manufacture of such folders is considerably simplified and reduced in production cost, no skilled labor being required.

It is to be noted that in accordance with the selection of the transparent or translucent resinous material, to relatively thin walls of the folder or cover a pre-tension or preload may be imparted so that the cover walls have the tendency to close upon each other while the enlarged and reinforced fold contributes to such action of pre-tensioning or preloading.

From the foregoing it can be readily seen that there has been provided in accordance with the present invention a novel process of manufacturing a flexible folder and like article, which process is characterized by steps of supplying a resinous material capable of solidifying into a flexible sheet, in a non-solid state into a circular-shaped form to thereby impart to said material a substantially tubular configuration resulting in a tube body, simultaneously forming integrally with said tube body at least one elongated reinforced rib of said material which extends longitudinally and exteriorly along said tube body, and then cutting said tube body into sections to thereby obtain a flexible cover of predetermined dimension. The tube body may be cut not only in transverse direction thereof but also in lengthwise direction thereof, when the tube body with its integral rib is discharged from said form.

Various changes and modifications may be made without departing from the spirit and scope of the present invention and it is intended that such obvious changes and modifications may be embraced by the annexed claims.

Having thus described the invention, what is claimed as new and desired to be secured by Letters Patent is:

1. A folder made from thermoplastic material comprising a seamless body of thermoplastic material having a pair of cover parts integrally joined by a centrally disposed reinforced ledge, said ledge being preloaded so as to be under tension so as to urge said cover parts towards each other.

2. A folder comprising a seamless and lengthy body of thermoplastic material provided with a relatively thin wall and divided into two cover parts and joined by a centrally disposed reinforcement ledge integral with and extending lengthwise of said body wall, said ledge gradually tapering toward said cover parts, said ledge being preloaded so as to be under tension so as to urge said cover parts towards each other.

3. Oppositely disposed separate folder structures derived from a single seamless, tubular body of thermoplastic material, whereby said body is cut along its longitudinal center line and at predetermined distances transversely to said center line; each folder structure comprising two sheet elements having terminal edges, and a reinforcing ledge integral with said elements and located at two adjacent ends thereof, said reinforcing ledge tapering from its center line towards said adjacent ends of said elements and being preloaded so that to said sheets a force is imparted which urges said elements in contact with each other at said terminal edges.

4. A folder structure and like receptacle cut from a seamless tubular body of thermoplastic material; comprising two sheet elements, and a reinforcing ledge integral with said elements and interconnecting the latter at two adjacent ends thereof, said reinforcing ledge tapering from its center line towards said adjacent ends of said elements and having a preload imparted thereto, so that said elements are normally urged into contact with each other from adjacent the junction of said ledge with said elements toward the outer edges of the latter.

5. A folder structure and like receptacle cut from a seamless tubular body of thermoplastic material; comprising two sheet elements, and a reinforcing ledge integral with said elements and interconnecting the latter at two adjacent ends thereof, said ledge being provided with a relative thick median portion and two end portions tapering from said median portion toward said adjacent ends of said elements, said reinforcing ledge being provided with a preload which is imparted thereto, so that said elements are normally urged into contact with each other from adjacent the junction of said ledge with said elements to the outer edges of the latter.

6. A folder, cover and the like container of thermoplastic material for holding documents comprising a body including an upper wall, a lower wall, and a reinforced fold integral with said walls and coextensive with the length of said walls, said reinforced fold being preloaded to urge said walls normally toward each other for closing said container.

7. A folder and like container made from thermoplastic material and shaped for holding substantially flat articles comprising two coextensive walls terminating in free end edges, a reinforced rib extending lengthwise of and spaced from said end edges of said walls and integral with the latter, said rib being preloaded to normally urge said walls together for closing said folder.

References Cited in the file of this patent

UNITED STATES PATENTS

| | | |
|---|---|---|
| 2,562,523 | Brunet | July 31, 1951 |
| 2,648,263 | Richens | Aug. 11, 1953 |
| 2,655,968 | Simmons | Oct. 20, 1953 |
| 2,725,913 | Horwin | Dec. 6, 1955 |
| 2,726,517 | Pruett | Dec. 13, 1955 |
| 2,731,053 | Lockhart | Jan. 17, 1956 |
| 2,732,592 | Funnicliff et al. | Jan. 31, 1956 |
| 2,737,860 | Randall | Mar. 13, 1956 |
| 2,788,039 | Schjeldahl | Apr. 9, 1957 |
| 2,793,670 | Schmidt | May 28, 1957 |
| 2,815,057 | Tupper | Dec. 3, 1957 |